United States Patent
Ehrler et al.

(10) Patent No.: US 12,284,937 B2
(45) Date of Patent: Apr. 29, 2025

(54) WORK APPARATUS

(71) Applicant: Andreas Stihl AG & Co. KG, Waiblingen (DE)

(72) Inventors: Denis Ehrler, Wernau (DE); Matthias Maier, Waiblingen (DE); Anton Angelusch, Waiblingen (DE)

(73) Assignee: Andreas Stihl AG & Co. KG, Waiblingen (DE)

(*) Notice: Subject to any disclaimer, the term of this patent is extended or adjusted under 35 U.S.C. 154(b) by 51 days.

(21) Appl. No.: 18/307,604

(22) Filed: Apr. 26, 2023

(65) Prior Publication Data
US 2023/0354740 A1    Nov. 9, 2023

(30) Foreign Application Priority Data
May 4, 2022  (EP) .................................... 22171686

(51) Int. Cl.
*A01D 34/416* (2006.01)
*A01D 34/84* (2006.01)
*A01D 34/90* (2006.01)
*B25F 5/02* (2006.01)

(52) U.S. Cl.
CPC ............ *A01D 34/416* (2013.01); *B25F 5/02* (2013.01); *A01D 34/84* (2013.01); *A01D 34/90* (2013.01)

(58) Field of Classification Search
CPC ...... A01D 34/416; A01D 34/84; A01D 34/90; B25F 5/02
See application file for complete search history.

(56) References Cited

U.S. PATENT DOCUMENTS

| | | | | | |
|---|---|---|---|---|---|
| 9,157,507 | B2* | 10/2015 | Zimmermann | ....... | F16H 57/025 |
| 9,160,211 | B2* | 10/2015 | Tanimoto | ............... | H02K 11/33 |
| 11,424,661 | B2* | 8/2022 | Lindberg | ............... | H02K 7/003 |
| 2005/0085324 | A1* | 4/2005 | Christ | ................... | F16H 57/033 |
| | | | | | 475/5 |
| 2008/0106159 | A1* | 5/2008 | Yoshida | ................. | A01G 3/088 |
| | | | | | 310/64 |
| 2009/0285517 | A1* | 11/2009 | Eckel | ..................... | H02K 7/083 |
| | | | | | 384/513 |
| 2015/0226270 | A1* | 8/2015 | Struber | ..................... | F16D 3/50 |
| | | | | | 384/445 |
| 2021/0234431 | A1* | 7/2021 | Momiyama | ............ | H02K 11/33 |
| 2021/0322132 | A1* | 10/2021 | Wang | ..................... | H02K 7/003 |

FOREIGN PATENT DOCUMENTS

| | | |
|---|---|---|
| EP | 2 905 880 A2 | 8/2015 |
| EP | 2 905 880 A3 | 1/2016 |
| EP | 3 780 357 A1 | 2/2021 |

* cited by examiner

*Primary Examiner* — Lucas E. A. Palmer
(74) *Attorney, Agent, or Firm* — Walter Ottesen, P.A.

(57) ABSTRACT

A work apparatus includes a housing, an electric motor arranged in the housing, the electric motor including a rotor shaft driven rotationally about a rotor axis, an output shaft for driving a tool, the output shaft being connected with a form fit to the rotor shaft on a receptacle of the rotor shaft, and a flange supported on the housing. The rotor shaft is mounted rotatably via a rotor shaft bearing arranged in the flange, the rotor shaft bearing extending along a bearing section in the direction of the rotor axis, and wherein the output shaft extends at least as far as the bearing section of the rotor shaft bearing.

21 Claims, 4 Drawing Sheets

WORK APPARATUS

CROSS-REFERENCE TO RELATED APPLICATIONS

This application claims priority of European patent application no. 22171686.3, filed May 4, 2022, the entire content of which is incorporated herein by reference.

BACKGROUND

Work apparatuses which include a housing and an electric motor arranged in the housing are known from the prior art. The electric motor includes a rotor shaft driven rotationally about an axis of rotation. A tool of the work apparatus is driven via an output shaft which is connected to the rotor shaft. Conventional electric motors, the rotors of which are mounted by a fixed/loose bearing in a motor housing, are used as the drive motor. The motor housing also accommodates the stator and supports the rotor and stator with respect to each other. As a result of this configuration, the electric motor is self-contained and can simply be mounted as a unit. The motor housing is conventionally fastened here to a flange with or without vibration damping elements, and therefore the electric motor can simply be exchanged by just the motor housing being unscrewed from the flange. A disadvantage of apparatuses of this type is that conventional electric motors take up an increased construction space in the housing of the work apparatus. During the operation of such apparatuses, this has proven to be particularly disadvantageous in respect of the shifting of the weight of the entire drive system including the battery.

SUMMARY

It is an object of the disclosure to provide a work apparatus with a compact constructional form and an optimized distribution of weight.

The aforementioned object is, for example, achieved by a work apparatus including a housing, an electric motor arranged in the housing, the electric motor including a rotor shaft driven rotationally about a rotor axis, an output shaft for driving a tool, the output shaft being connected with a form fit to the rotor shaft on a receptacle of the rotor shaft, a flange supported on the housing. The flange encloses the motor-side end of the output shaft. The rotor shaft is mounted rotatably via a rotor shaft bearing arranged in the flange. The rotor shaft bearing refers to the entirety of the bearing points by which the rotor shaft is completely supported. The rotor shaft bearing extends along a bearing section in the direction of the rotor axis. The output shaft extends at least as far as the bearing section of the rotor shaft bearing.

As a result of the output shaft extending into the bearing section, a constructional length of the rotor shaft that is required because of the bearing situation of the rotor shaft can be additionally used to provide a likewise required minimum length of an overlap of the output shaft with the rotor shaft. A reduction in the axial constructional length of the flange/electric motor unit is thereby possible, leading to a more compact housing and better ergonomics. The reduction in the axial constructional length of the flange/electric motor unit makes it possible to minimize a distance between the battery pack and that end of the flange which is close to the tool.

The receptacle of the rotor shaft is configured in particular as an end-side opening in the rotor shaft, into which the output shaft projects at its end close to the motor.

The flange of the work apparatus thus obtains a dual function. Firstly, the output shaft and the rotor shaft of the electric motor are connected within the flange via the receptacle of the rotor shaft. Secondly, the rotor is mounted via the rotor shaft, in particular completely by means of the rotor shaft bearing. The rotor shaft bearing is in particular arranged completely in the flange. In particular, a support for the stator is provided on the flange, and therefore rotor and stator are oriented with respect to each other by means of the flange. A conventional mounting of the electric motor can be dispensed with. The work apparatus is therefore very compact. The weight distribution is concentrated in the region of the electric motor, thus increasing the carrying comfort for the operator.

It is advantageously provided that the bearing section extends over a length in the direction of the rotor axis, wherein the output shaft overlaps the bearing section in the direction of the rotor axis by at least 20% of the length of the bearing section. The end of the output shaft is preferably located in the rotor shaft bearing in the direction of the rotor axis. The receptacle of the rotor shaft is preferably also formed in the rotor shaft bearing in the direction of the rotor axis. Therefore, the region of maximum torque transmission from the rotor shaft to the output shaft is reinforced by the rotor shaft bearing.

It is advantageously provided that the receptacle is formed integrally with the rotor shaft. Particularly preferably, the receptacle of the rotor shaft is part of a polygonal connection. Further connecting elements for connecting output shaft and rotor shaft can therefore be dispensed with.

The rotor shaft bearing is preferably configured as an overhung bearing. The electric motor is thereby compactly constructed. It is preferably provided that the rotor shaft bearing includes a first bearing and a second bearing. The first bearing and the second bearing are arranged at a distance from each other. The bearings are advantageously held on the rotor shaft in the form of a clearance fit. The clearance fit makes it possible to push the rotor shaft in a simple manner into the rotor shaft bearing. An O ring is preferably arranged between the bearings of the rotor shaft bearing and the rotor shaft. The O ring preferably lies in a groove formed in the rotor shaft. If the rotor shaft is pushed into the rotor shaft bearing, the O ring makes contact with the bearing inner rings. The O ring therefore forms a frictionally locking driver between the rotor shaft and the bearing inner rings. Relative movements between the rotor shaft and the bearing inner rings are avoided. Consequently, frictional corrosion at the bearing seats can also be avoided. The bearings are preferably configured as rolling bearings, in particular as ball bearings.

It is advantageously provided that the rotor shaft extends from a first end as far as a second end, the receptacle being formed at the first end of the rotor shaft. Preferably, a permanent magnet as part of a rotor of the electric motor is arranged on the rotor shaft via a fastening section of the rotor shaft, the rotor shaft bearing being preferably arranged in the direction of the rotor axis between the first end of the rotor shaft and the fastening section of the rotor shaft. The permanent magnet can be arranged directly on the fastening section of the rotor shaft. In an alternative embodiment, it can be provided that the permanent magnet is fastened to the rotor shaft just indirectly via the fastening section of the rotor shaft. A fanwheel is preferably arranged at the second end of the rotor shaft. It is therefore possible to suck up a cooling air flow which flows through the electric motor and cools the latter.

Particularly advantageously, a fan housing is fastened to the flange, the fan housing surrounding the fanwheel. The electric motor preferably includes a stator, the stator being supported on the housing via the flange. The stator is preferably rigidly connected to the flange. The flange is preferably fastened to the housing via a retaining clamp. At least one damping element is advantageously provided between the flange and the retaining clamp. The flange itself, and also the stator, the rotor and/or the fan housing are therefore vibrationally decoupled from the housing.

BRIEF DESCRIPTION OF DRAWINGS

The invention will now be described with reference to the drawings wherein.

DETAILED DESCRIPTION

Figure 1:
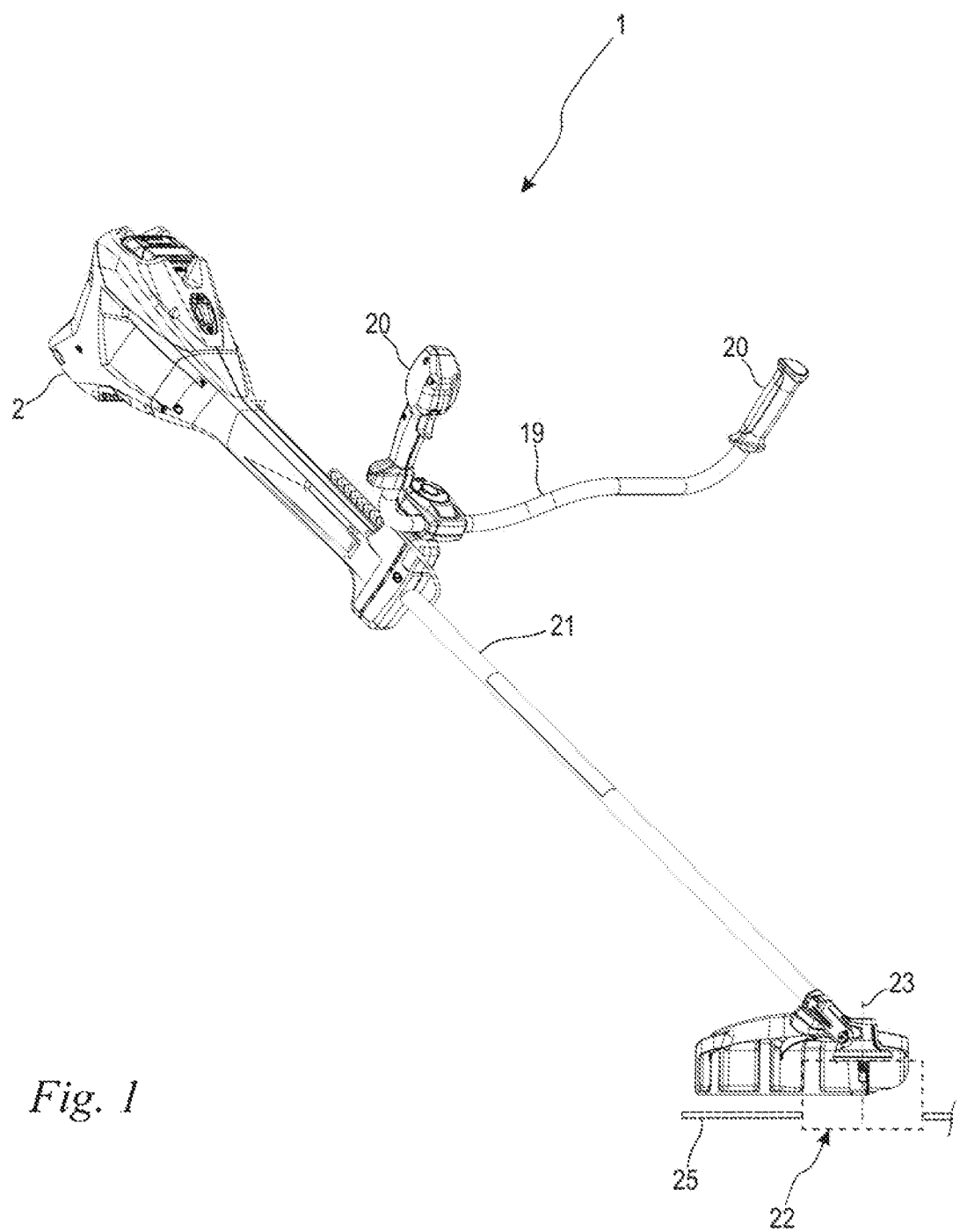
FIG. 1 shows a perspective illustration of a work apparatus in the form of a brush cutter.
Figure 2:
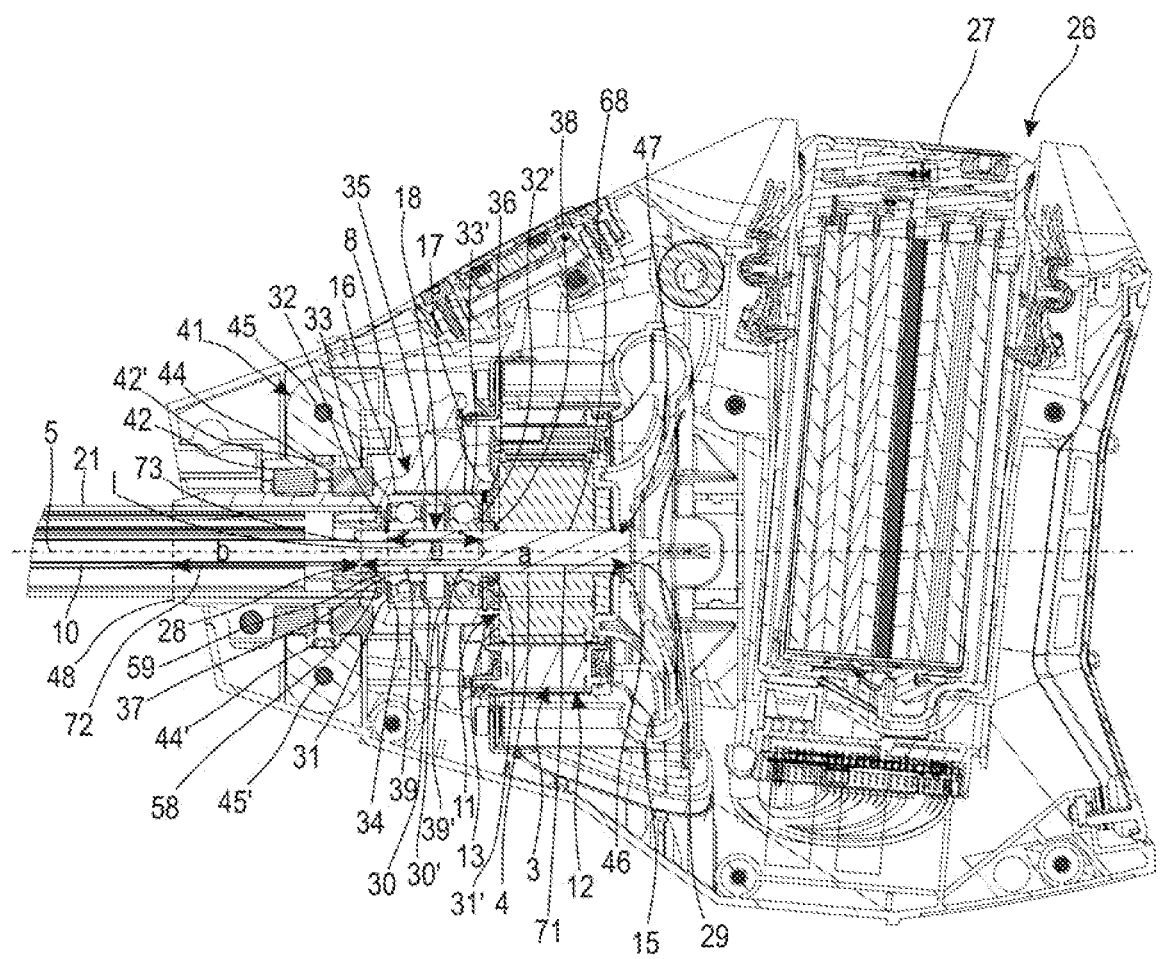
FIG. 2 shows part of a sectional illustration of the work apparatus, in particular the drive motor as an internal rotor motor and the output shaft, without the front part of the housing.

FIG. 1 shows a work apparatus 1 which is in the form of a brush cutter. The work apparatus 1 is preferably a handheld, in particular a manually carried work apparatus. The work apparatus 1 is configured in particular as a shaft apparatus. The shaft apparatus includes a shaft 21, at one end of which a tool 25 of the work apparatus 1 is arranged and at the other end of which a housing 2 is arranged, to which in particular a power supply unit for a drive of the work apparatus 1 can be coupled. The shaft 21 therefore forms a guide tube of the work apparatus 1. Manually carried should be understood so as to mean that when the work apparatus is operated correctly the operator carries the work apparatus. The work apparatus 1 can be in particular also in the form of a pole pruner or similar work apparatus. A drive motor in the form of an electric motor 3 is arranged on the housing 2 (FIG. 2). An output shaft 10 which is driven by the electric motor 3 arranged in the housing 2 and is operatively connected to the mower head 22 and drives the mower head 22 rotationally about a rotational axis 23 projects through the shaft 21. The mower head 22 can be driven here directly by the output shaft 10 or by intermediately connected units, such as in particular a transmission. The string mower head 22 is covered by a protective hood 24 on the side facing the operator during operation. The mower head 22 has at least one cutting tool 25 which serves for cutting material to be cut, such as grass, undergrowth or the like. In order to guide the work apparatus 1 during operation, handles 20 are provided which, in the embodiment, are arranged on a guide handle 19. The guide handle 19 is fastened to the housing 2 of the work apparatus 1. The housing 2 is connected to the shaft 21 via damping elements.

As shown in FIG. 2, a battery shaft 26 in which a battery 27 is accommodated is formed on the housing 2. The battery 27 is used for supplying power to the electric motor 3. The electric motor 3 includes a rotor 11 and a stator 12. The rotor 11 includes a rotor shaft 4 with a rotor axis 5. The rotor shaft 4 extends along its rotor axis 5 from a first end 28 to a second end 29. The rotor shaft 4 includes a receptacle 6. The receptacle 6 of the rotor shaft 4 serves for fastening, in particular for form-fitting fastening of the output shaft 10 of the work apparatus 1. The receptacle 6 is arranged at the first end 28 of the rotor shaft 4. The output shaft 10 and the rotor shaft 4 are connected to each other for conjoint rotation in the direction of rotation of the rotor shaft 4. The output shaft 10 and the rotor shaft 4 are preferably connected to each other via a polygonal connection, with the receptacle 6 of the rotor shaft 4 being part of the polygonal connection in such an embodiment of the work apparatus 1.

Figure 3:
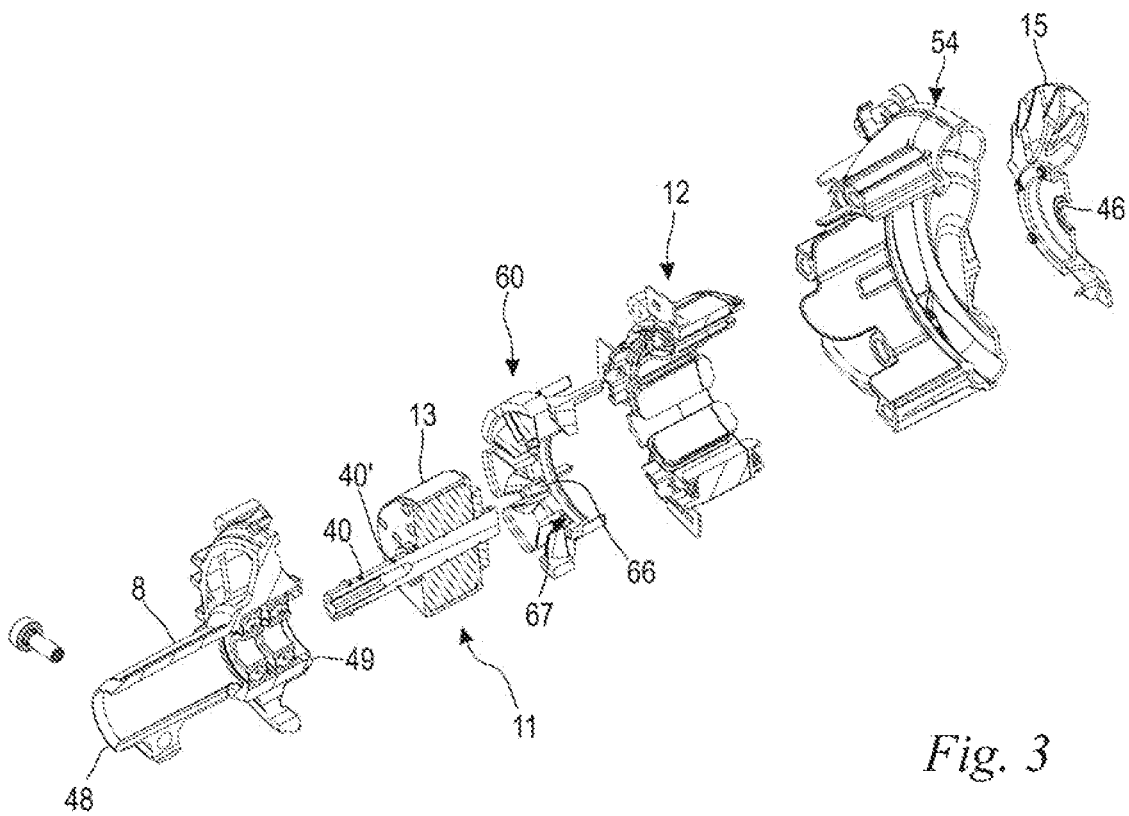
FIG. 3 shows a perspective exploded illustration of the drive motor with a housing connection.

As shown in FIG. 2, a fanwheel 15 is arranged at the second end 29 of the rotor shaft 4. The fanwheel 15 serves during operation of the work apparatus 1 to generate a cooling air flow which flows through the electric motor 3 and cools the latter. The fanwheel 15 is connected to the rotor shaft 4 for conjoint rotation. In the embodiment, the fanwheel 15 is fastened on the rotor shaft 4 in the direction of rotation of the rotor shaft 4 in a form-fitting manner, in particular via a tongue and groove connection 46 (FIG. 3). In the direction of the rotor axis 5, the fanwheel 15 is held on the rotor shaft 4 via a securing ring 47.

As shown in FIG. 2, the rotor 11 is mounted rotatably about the rotor axis 5. The rotor 11 includes a permanent magnet 13 which is preferably arranged directly on a fastening section 68 of the rotor shaft 4. The permanent magnet 13 is preferably pressed onto the rotor shaft 4. The stator 12 includes a multiplicity of coils 14. The coils 14 are each wound around an iron core and surround the rotor 11, in particular the permanent magnet 13 of the rotor 11 radially with respect to the rotor axis 5. The stator 12 is connected to the housing 2 so as to be secure against rotation. The rotor 11 is mounted rotatably in relation to the housing 2. If the coils 14 of the stator 12 are energized, a magnetic field is produced which enters into interaction with the magnetic field of the rotor 11, in particular with the magnetic field of the permanent magnet 13, in such a manner that the rotor 11 rotates. The electrical work is converted into mechanical work.

As shown in FIG. 2, the rotor 11 is mounted by means of a rotor shaft bearing 9. The rotor shaft bearing 9 includes a first bearing 16 and a second bearing 17. The rotor shaft bearing 9 extends over a bearing section 18 along the rotor axis 5. The first bearing 16 and the second bearing 17 each include a bearing inner side 30, 30' which are arranged facing each other. The first bearing 16 and the second bearing 17 each include a bearing outer side 31, 31' which are arranged facing away from each other. The bearing section 18 extends from the bearing outer side 31 of the first bearing 16 as far as the bearing outer side 31' of the second bearing 17. The bearing section 18 extends over a length l in the direction of the rotor axis 5. The rotor shaft bearing 9 is configured as an overhung bearing with respect to the rotor 11. An overhung bearing is distinguished in that the forces to be absorbed by the bearings are not introduced between the bearings, but rather outside the bearing section 18. The fastening section 68 is provided axially away from the bearing section 18. In the embodiment according to FIG. 2, the permanent magnet 13 of the rotor 11 is arranged outside the bearing section 18. The rotor shaft bearing 9 is arranged in the direction of the rotor axis 5 between the first end 28 of the rotor shaft 4 and the permanent magnet 13.

Figure 4:
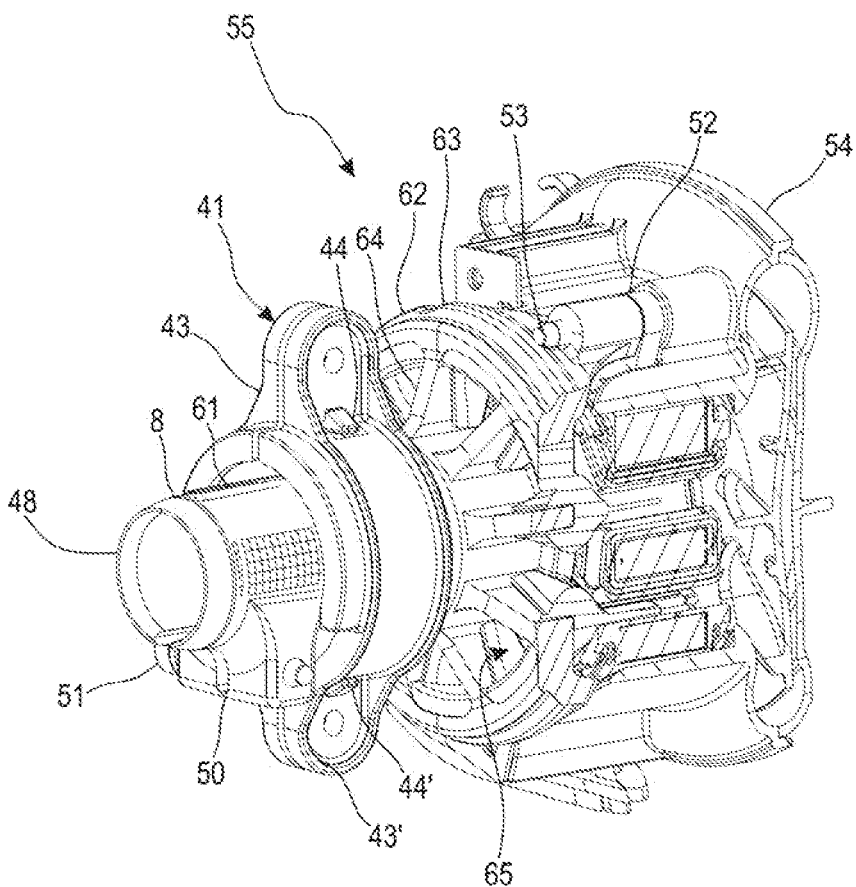
FIG. 4 shows a perspective illustration of the drive motor with a housing connection; and, FIG. 5 shows part of a sectional illustration of the work apparatus, in particular the drive motor as an external rotor motor and the output shaft, without the front part of the housing.

As shown in FIG. 2, the work apparatus 1 includes a flange 8. The electric motor 3 is held on the housing 2 of the work apparatus 1 via the flange 8. The rotor 11 and the stator 12 of the electric motor 3 are connected to the flange 8 at different points in each case of the flange 8. There is no separate motor housing which mounts the rotor 11 and the stator 12 with respect to each other and is connected as a self-contained unit to the flange 8. On the contrary, the flange 8 constitutes an integral motor housing. In the embodiment of the work apparatus 1, a retaining clamp 41 is provided which retains the flange 8 on the housing 2. The retaining clamp 41 is fixedly connected to the housing 2, in particular via at least one threaded connection 45, 45'. In the embodiment, two threaded connections 45, 45' are provided for fastening the retaining clamp 41 to the housing 2. In the embodiment, the retaining clamp 41 is a component formed separately with respect to the housing 2. In an alternative embodiment of the work apparatus 1, provision may also be made that the retaining clamp 41 is formed on the housing 2, that is, is integrated in the housing geometry, in particular is formed integrally with the housing 2. The retaining clamp 41 engages around the flange 8, with at least one damping element 42, 42' being provided between the retaining clamp 41 and the flange 8. The at least one damping element 42, 42' decouples the housing 2 and the electric motor 3 in respect of transmitting vibrations. In the embodiment, two damping elements 42, 42' are arranged between the retaining clamp 41 and the flange 8. The damping elements 42, 42' are annular. The damping elements 42, 42' are preferably formed from an elastomer. The retaining clamp 41 is preferably formed in two parts, with the clamp halves 43, 43' preferably being connected to each other via latching connections 44, 44' (FIGS. 2 and 4).

As shown in FIG. 2, the rotor shaft bearing 9 is arranged in the flange 8 of the work apparatus 1. In the embodiment, the first bearing 16 and the second bearing 17 are configured as ball bearings. The bearings 16, 17 each include an inner ring 32, 32' and an outer ring 33, 33'. The outer ring 33 of the first bearing 16 is supported on a shoulder 34 of the flange 8 in the direction of the first end 28 of the rotor shaft 4. A spacer ring 35 is arranged between the outer ring 33 of the first bearing 16 and the outer ring 33' of the second bearing 17. In the direction of the second end 29 of the rotor shaft 4, the outer ring 33' of the second bearing 17 is supported on a securing ring 36. The inner ring 32 of the first bearing 16 is supported against a securing ring 37 in the direction of the first end 28 of the rotor shaft 4. The inner ring 32' of the second bearing 17 is supported against a holding ring 38 in the direction of the second end 29 of the rotor shaft 4. The holding ring 38 is pressed onto the rotor shaft 4. A sealing ring 39 is arranged between the inner ring 32 of the first bearing 16 and the rotor shaft 4. A sealing ring 39' is likewise arranged between the inner ring 32' of the second bearing 17 and the rotor shaft 4. The sealing rings 39, 39' each lie in a groove 40, 40' of the rotor shaft 4, the sealing rings 39, 39' being configured in such a manner that they make contact both with the rotor shaft 4 and with the inner ring 32, 32'. The sealing ring 39, 39' is preferably an O ring. The friction between the inner rings 32, 32' and the rotor shaft 4 is increased by means of the sealing ring 39, 39'. This promotes the concomitant rotation of the inner rings 32, 32' on the rotor shaft 4. Microrelative movements and the resulting frictional corrosion between the inner rings 32, 32' of the bearing 16, 17 and the rotor shaft 4 can therefore be avoided. As shown in FIG. 2, the rotor shaft 4 is mounted completely in the rotor shaft bearing 9 arranged in the flange 8.

As shown in FIG. 2, the receptacle 6 of the rotor shaft 4 extends in the direction of the rotor axis 5 from the first end 28 of the rotor shaft 4 at least as far as the bearing section 18. The output shaft 10 extends in the direction of the rotor axis 5 over the first end 28 of the rotor shaft 4 at least as far as the bearing section 18. In the embodiment, the output shaft 10 is fastened to the rotor shaft 4 in such a manner that the output shaft 10 is formed in an overlapping manner with the bearing section 18 in the direction of the rotor axis 5. The output shaft 10 preferably overlaps the bearing section 18 by at least 20%, preferably at least 30%, in particular at least 40% of a length l of the bearing section 18 in the direction of the rotor axis 5.

As shown in FIG. 2, the shaft 21, by the output shaft 10 being mounted rotationally, is fastened to the flange 8. The flange 8 includes two ends 48, 49, with the shaft 21 being accommodated at the one end 48 and the rotor shaft bearing 9 being formed at the other end 49. As shown in FIG. 4, the flange 8 is at least partially slit at its one end 48 in the direction of the rotor axis 5. By means of the slit 50 and the flange 8, the flange 8 can be expanded at its one end 48 in such a manner that the shaft 21 can be pushed into the flange 8. Furthermore, a threaded connection 51 is formed at the one end 48 of the flange 8. The threaded connection 51 is arranged on the flange 8 in such a manner that the slit 50 is narrowed upon tightening of the threaded connection 51 and the shaft 21 is clamped in the flange 8. The flange 8 is not slit in the region of the bearing section 18. The flange 8 thus forms a stiff bearing seat for the rotor shaft bearing 9.

As FIG. 4 shows, the stator 12 includes a holding frame 52. The stator 12 is fastened by its holding frame 52 to the flange 8. The stator 12 is rigidly connected to the flange 8. The holding frame 52 of the stator 12 is fastened to the flange 8 via a plurality of threaded connections 53. In addition, the work apparatus 1 includes a fan housing 54, the fan housing 54 surrounding the fanwheel 15. The fan housing 54 is likewise fastened to the flange 8. In the embodiment, the holding frame 52 and the fan housing 54 are fastened on the flange 8 via the same threaded connections 53. In an embodiment of the work apparatus 1, the fan housing 54 together with the flange 8 is fastened to the housing 2 of the work apparatus via further fastening elements, not illustrated specifically. The fastening elements are preferably configured as antivibration elements.

The installation of an assembly 55 (FIG. 4) of the work apparatus 1, which assembly can be fastened as a preassembled unit to the housing 2 of the work apparatus 1, is described below.

In a first installation step, the rotor shaft bearing 9 is inserted into the flange 8. The first bearing 16 is introduced into the flange 8 via its other end 49 and pressed against the shoulder 34 of the flange 8. Subsequently, the spacer ring 35 and then the second bearing 17 are pushed against the outer ring 33 of the first bearing 16. The bearings 16, 17 are fixed in the flange 8 via the securing ring 36.

In a second installation step, the rotor 11 is pushed into the rotor shaft bearing 9. Of course, the permanent magnet 13 has to be fastened beforehand on the rotor shaft 4. The holding ring 38 is pressed onto the rotor shaft 4 adjacent to the permanent magnet 13 and facing the first end 28 of the rotor shaft 4. The sealing rings 39, 39' are then inserted into the grooves 40, 40' of the rotor shaft 4. The rotor shaft 4 is pushed with its first end 28 in front into the rotor shaft bearing 9 until the holding ring 38 strikes against the inner ring 32' of the second bearing 17. Accordingly, the holding ring 38 forms an installation stop for the rotor shaft 4. The inner rings 32, 32' of the bearings 16, 17 form a clearance fit with the rotor shaft 4, and therefore the rotor shaft 4 can be pushed into the rotor shaft bearing 9. The securing ring 37 is then inserted via the one end 48 of the flange 8 onto the rotor shaft 4 so that the rotor shaft 4 is fixed via the inner rings 32, 32' of the two bearings 16, 17.

Subsequently, the stator 12 and the fan housing 54 are screwed to the flange 8. The fan housing 54 includes a base housing 56 and a fan cover 57. Before the fan cover 57 can be screwed to the base housing 56, the fanwheel 15 has to be mounted at the second end 29 of the rotor shaft 4. For this purpose, the fanwheel 15 is pushed onto the end 29 of the rotor shaft 4 against the permanent magnet 13 and fixed with a securing ring 47. The fan cover 57 is then screwed onto the base housing 56.

The retaining clamp 41 is then fastened with the damping elements 42, 42' on the flange 8. The preassembled assembly 55 can now be inserted into the housing 2 and fastened. Finally, the shaft 21 together with the output shaft 10 has to be pushed into the flange 8 and fixed via the threaded connection 51. So that the output shaft 10 slides into the receptacle 6 of the rotor shaft 4, a guide element 58 is provided at the one end of the shaft 21. The guide element 58 has a reduced opening diameter, with a bevel 59 being provided on the guide element 59 in order to center the rotor shaft 4.

As FIG. 3 shows, the electric motor 3 includes an air guide element 60. The air guide element 60 is arranged between the flange 8 and the stator 12 in the direction of the rotor axis 5. The air guide element 60 is fixedly connected to the stator 12. The air guide element 60 is configured in such a manner that the cooling air flow sucked up by the fanwheel 15 is directed in a targeted manner onto the coils 14 of the stator 12 in order to cool them during the operation of the electric motor 3. As FIG. 4 also shows, the flange 8, in addition to a hollow cylindrical section 61, by shaft 21 and the rotor shaft bearing 9 being accommodated, includes an outer ring section 62. The outer ring section 62 surrounds the hollow cylindrical section 61 and is provided in the region of the rotor shaft bearing 9 in the direction of the rotor axis 5. The ring section 62 is formed as a ring 63 which is connected in turn to the hollow cylindrical section 61 via a plurality of flow guiding elements 64. The hollow cylindrical section 61, the ring 63 and two mutually adjacent flow guide elements 64 in each case form a flow opening 65 in the flange 8, through which a cooling air flow sucked up by the fanwheel 15 can flow.

As FIG. 4 shows, the air guide element 60 is plugged onto the outer ring section 62 of the flange 8. Accordingly, the air guide element 60 is arranged between the flange 8 and the stator 12. The air guide element 60 likewise has a further flow guide element 66, the flow guide element 66 being configured in such a manner that the cooling air flow flowing through the flow opening 65 to the air guide element 60 is compressed radially toward the rotor axis 5. Furthermore, the air guide element 60 has a further flow opening 67 which lies level with the coils 14 of the stator 12 in the direction radially with respect to the rotor axis 5. The cooling air flow is therefore bundled by the air guide element 60 and directed in a targeted manner onto the coils 14 of the stator 12.

Figure 5:
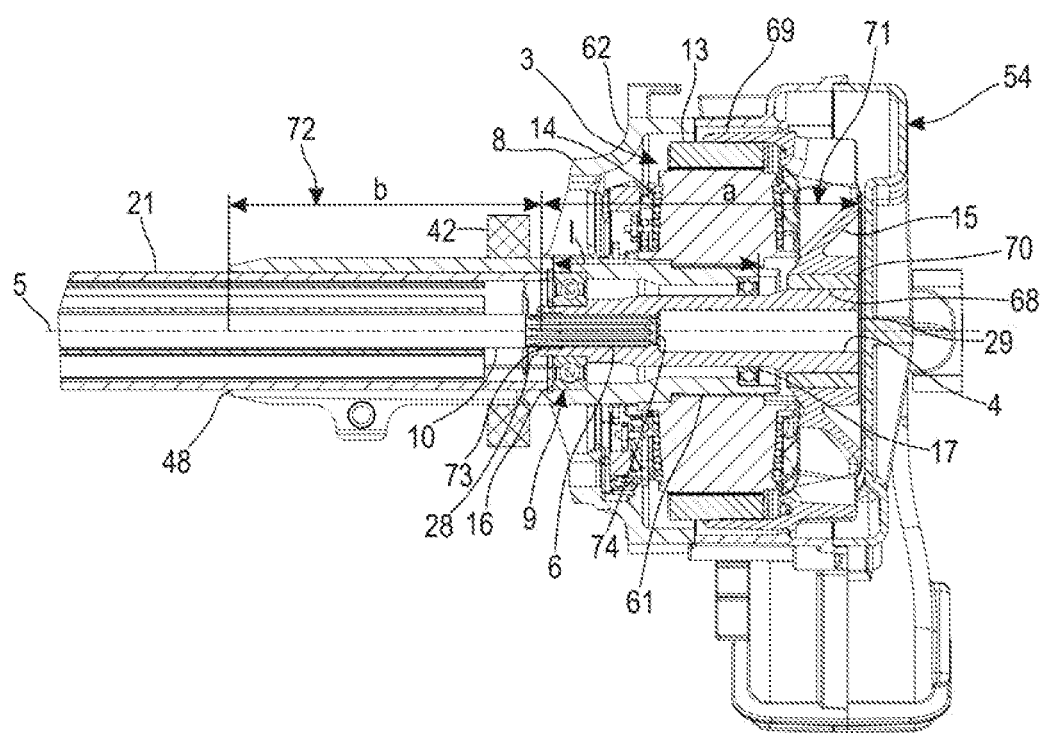

FIG. 5 shows an alternative embodiment of the work apparatus 1. The same reference signs denote the same components of the various embodiments. While, in the embodiment of the work apparatus 1 according to FIGS. 2 to 4, the electric motor 3 is configured as an "internal rotor motor", FIG. 5 shows a further embodiment of the electric motor 3 as an "external rotor motor". Essentially, the difference of the further embodiment over the embodiment according to FIGS. 2 to 4 is described below.

As shown in FIG. 5, the permanent magnet 13 is merely held indirectly on the rotor shaft 4 via the fastening section 68 of the rotor shaft 4. The fanwheel 15 is arranged on the fastening section 68. As in the embodiment of the work apparatus 1 according to FIG. 2, the fastening section 68 is provided axially away from the bearing section 18. By contrast, the permanent magnet 13 lies at least partially in the direction of the rotor axis 5 in the bearing section 18. In the embodiment, the fanwheel 15 sits on an adapter element 70, the adapter element 70 in turn being fastened on the fastening section 68. The adapter element 70 is preferably a sleeve. In an alternative embodiment, provision may be made that the fanwheel 15 is also provided directly on the fastening section 68 of the rotor shaft 4. The fanwheel 15 is likewise fastened to the second end 29 of the rotor shaft 4. The fanwheel 15 is connected to the rotor shaft 4 in a manner secure against rotation. On the circumferential side, the fanwheel 15 has a cylindrical holding section 69, the holding section 69 extending in the direction of the rotor axis 5 of the rotor shaft 4 from the main body of the fanwheel 15 to the rotor shaft bearing 9. The permanent magnet 13 is fastened to the cylindrical holding section 69. The permanent magnet 13 is arranged on the inner side, that is, on that side of the holding section 69 which faces the stator 12. The permanent magnet 13 lies radially with respect to the rotor axis 5 of the rotor shaft 4 outside the stator 12, in particular outside the coils 14 of the stator 12.

As FIG. 5 shows, the stator 12 is fixedly connected to the flange 8. The stator 12 is arranged on the outer side of the hollow cylindrical section 61 of the flange 8. The stator 12 is fixedly connected to the flange 8. Accordingly, the stator 12 is fastened circumferentially on the flange 8 whereas, in the embodiment of the work apparatus 1 according to FIGS. 2 to 4, the stator 12 is fastened on the face side to the flange 8. The fan housing 54 is fastened directly to the flange 8, in particular to the outer ring section 62 of the flange 8. The rotor shaft 4 is preferably configured entirely as a hollow shaft.

As FIGS. 2 and 5 show, the receptacle 6 of the rotor shaft 4 includes a first end 73 and a second end 74 in the direction of the rotor axis 5. The distance between the first end 73 of the receptacle 6 and the second end 29 of the rotor shaft 4 is greater than the distance between the second end 74 of the receptacle 6 and the second end 29 of the rotor shaft 4. Furthermore, the work apparatus 1 includes a motor section 71 and a holding section 72. The motor section 71 has a length a, the length a corresponding to the distance of the first end 73 of the receptacle 6 and the second end 29 of the rotor shaft 4. The holding section 72 corresponds to that region of the flange 8 in which the output shaft 10 is accommodated in the flange 8. The holding section 72 has a length b, the length b corresponding to the distance of the first end 48 of the flange 8 and the first end 73 of the receptacle 6. The work apparatus 1 is configured in such a manner that the length a of the motor section 71 corresponds at most to 2.5 times the length b of the holding section 72. It thereby becomes clear that the drive unit of the work apparatus 1 has a very compact construction. Particularly preferably, the length a of the motor section 71 corresponds at most to 2 times, in particular at most 1.6 times the length b of the holding section 72.

It is understood that the foregoing description is that of the preferred embodiments of the invention and that various changes and modifications may be made thereto without departing from the spirit and scope of the invention as defined in the appended claims.

The invention claimed is:

1. A work apparatus comprising:
    a housing;
    an electric motor arranged in said housing, said electric motor including a rotor shaft configured to be driven rotationally about a rotor axis;
    an output shaft configured to drive a tool;
    said output shaft being connected with a form fit to said rotor shaft on a receptacle of said rotor shaft;
    a flange supported on said housing, said flange having a first end and a second end, wherein a shaft is accommodated at said first end and said rotor shaft and a rotor shaft bearing are formed on said second end;
    said rotor shaft being mounted rotatably via said rotor shaft bearing arranged in said flange, wherein said rotor shaft is completely rotatably supported via said rotor shaft bearing;
    said rotor shaft bearing extending along a bearing section in a direction of the rotor axis; and,
    said output shaft extending at least as far as said bearing section of said rotor shaft bearing.

2. The work apparatus of claim 1, wherein said bearing section extends over a length L in the direction of the rotor axis; and, said output shaft overlaps said bearing section in the direction of the rotor axis by at least 20% of said length L.

3. The work apparatus of claim 1, wherein said receptacle is formed integrally with said rotor shaft.

4. The work apparatus of claim 1, wherein said receptacle of said rotor shaft is part of a polygonal connection.

5. The work apparatus of claim 1, wherein said rotor shaft bearing is configured as an overhang bearing via which force to be absorbed by said rotor shaft bearing is introduced outside said bearing section with respect to said rotor shaft.

6. The work apparatus of claim 1, wherein said rotor shaft bearing includes a first bearing and a second bearing; and, said first bearing and said second bearing are held on the rotor shaft via a clearance fit.

7. The work apparatus of claim 6, wherein an O-ring is arranged between said first and second bearings of said rotor shaft bearing and said rotor shaft.

8. The work apparatus of claim 7, wherein said rotor shaft has a groove formed therein; wherein said first bearing and said second bearing include inner bearing rings; said O-ring is arranged in said groove; and, said O-ring contacts said inner bearing rings as a result of which said O-ring forms a frictionally locking driver between said rotor shaft and said inner bearing rings.

9. The work apparatus of claim 6, wherein said first bearing and said second bearing are ball bearings.

10. The work apparatus of claim 1, wherein said rotor shaft extends from a first end to a second end; and, said receptacle is formed at said first end of said rotor shaft.

11. The work apparatus of claim 10, wherein a permanent magnet as part of a rotor of said electric motor is arranged on said rotor shaft via a fastening section of the rotor shaft; and, said rotor shaft bearing is arranged in the direction of the rotor axis between said first end of said rotor shaft and said fastening section of said rotor shaft.

12. The work apparatus of claim 10 further comprising a fanwheel arranged at said second end of said rotor shaft.

13. The work apparatus of claim 1 further comprising:
    a fanwheel; and,
    a fan housing surrounding said fanwheel and fastened to said flange.

14. The work apparatus of claim 1, wherein said electric motor includes a stator; and, said stator is supported on said housing via said flange.

15. The work apparatus of claim 1, wherein said flange is fastened to said housing via a retaining clamp.

16. The work apparatus of claim 15 further comprising at least one damping element provided between said flange and said retaining clamp.

17. The work apparatus of claim 1, wherein said rotor shaft bearing includes all bearing points of said rotor shaft.

18. The work apparatus of claim 1, wherein the rotor shaft bearing is completely arranged in said flange.

19. The work apparatus of claim 1, wherein said electric motor is held on said housing via said flange; and, said electric motor has no separate motor housing which mutually mounts said rotor and said stator with respect to each other and is connected as a self-contained unit to said flange.

20. The work apparatus of claim 1, wherein said rotor shaft bearing includes a first bearing and a second bearing each having an inner ring and an outer ring.

21. The work apparatus of claim 1, wherein said flange includes a hollow cylindrical section and an outer ring section; and, said rotor shaft and said rotor shaft bearing are accommodated in said hollow cylindrical section; said outer ring section surrounds said hollow cylindrical section and is formed by one ring which is connected to said hollow cylindrical section via a plurality of flow guiding elements.

* * * * *